(12) United States Patent
Kondo et al.

(10) Patent No.: US 6,702,356 B2
(45) Date of Patent: Mar. 9, 2004

(54) INSTRUMENT PANEL MODULE INCLUDING POWER/SIGNAL TRANSMISSION SYSTEM FOR VEHICLE

(75) Inventors: Masayuki Kondo, Toyota (JP); Haruhiko Sato, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/283,185

(22) Filed: Oct. 30, 2002

(65) Prior Publication Data

US 2003/0094831 A1 May 22, 2003

(30) Foreign Application Priority Data

Nov. 16, 2001 (JP) .................... P2001-351884

(51) Int. Cl.[7] .................... B62D 25/14; B60K 37/02
(52) U.S. Cl. .................... 296/70; 180/90
(58) Field of Search .................... 296/70, 72; 180/90

(56) References Cited

U.S. PATENT DOCUMENTS

| | | | | |
|---|---|---|---|---|
| 5,324,203 A | * | 6/1994 | Sano et al. | |
| 5,434,753 A | * | 7/1995 | Watanabe | |
| 5,521,443 A | * | 5/1996 | Imura et al. | |
| 5,663,866 A | | 9/1997 | Ichikawa et al. | |
| 5,934,733 A | * | 8/1999 | Manwaring | 296/72 |
| 5,934,744 A | * | 8/1999 | Jergens et al. | 296/192 |
| 5,992,925 A | * | 11/1999 | Alberici | 296/203.02 |
| 6,048,020 A | * | 4/2000 | Gronowicz et al. | |
| 6,265,788 B1 | * | 7/2001 | Davidson et al. | |
| 6,456,047 B1 | * | 9/2002 | Gohara et al. | |
| 6,474,716 B2 | * | 11/2002 | Shikata et al. | |

FOREIGN PATENT DOCUMENTS

| | | |
|---|---|---|
| GB | 2 364 285 A | 1/2002 |
| GB | 2 368 054 A | 4/2002 |
| JP | 10-310002 | 11/1998 |
| JP | 10-310002 A | 11/1998 |
| JP | 11-5496 A | 1/1999 |

* cited by examiner

*Primary Examiner*—Stephen T. Gordon
*Assistant Examiner*—Paul Chenevert
(74) *Attorney, Agent, or Firm*—Sughrue Mion, PLLC

(57) ABSTRACT

An electrical equipment (component) for a vehicle is separated into an exterior appearance member and an interior control member including a drive circuit for the electrical equipment (component). The exterior appearance member is provided on a dash panel. The interior control member is provided on a reinforcement. The dash panel and the reinforcement are then integrated.

6 Claims, 4 Drawing Sheets

FIG. 5
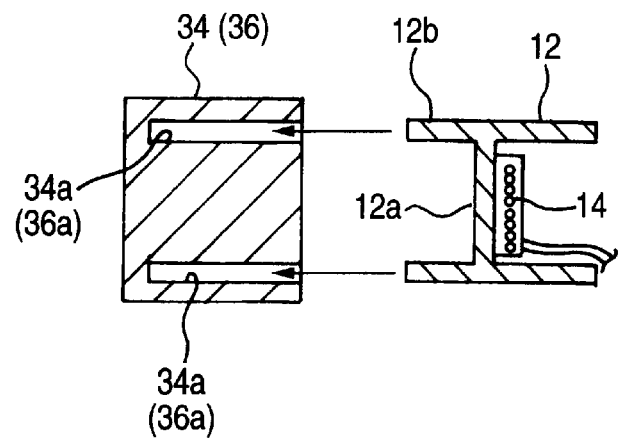
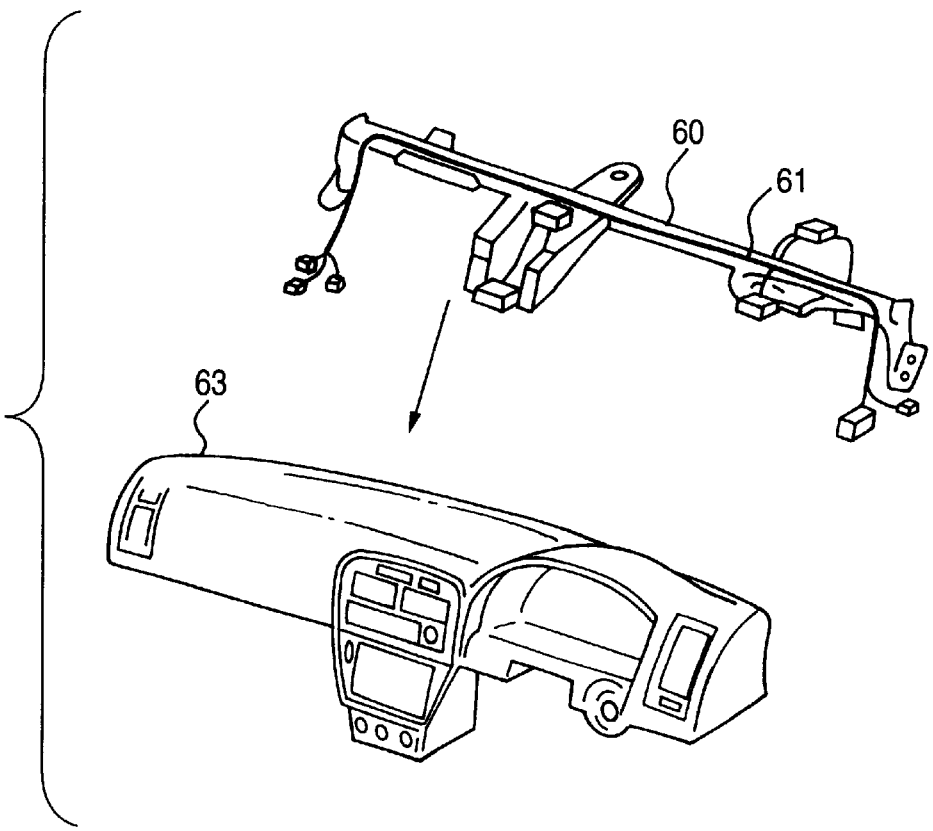
FIG. 6

INSTRUMENT PANEL MODULE INCLUDING POWER/SIGNAL TRANSMISSION SYSTEM FOR VEHICLE

BACKGROUND OF THE INVENTION

This invention relates to an instrument panel module including a power/signal transmission system for a vehicle.

Electrical equipment, including meters, various switches and sensors, connection boxes, a radio unit and an air conditioner, are mounted on an instrument panel of a vehicle. A wire harness provided with a large number of wires, is connected to these electrical equipments.

Such a wire harness is wired while being integrally mounted on a reinforcement, as disclosed in Japanese Patent Publication No. 10-31 0002A.

In this example shown in FIG. 6, the wire harness 61 is integrally mounted on the reinforcement 60 and extended therealong. Hence, a dash panel 63 and the reinforcement 60 can be relatively easily mounted on a vehicle body (not shown).

Each of various electrical equipments, mounted on the dash panel 63, comprise a structural member in which an interior control section including a drive circuit or the like, and an exterior appearance section including a display or the like are provided in an integrated manner. Therefore, many kinds of electrical equipment must be prepared for the dash panel 63 in accordance with the design variations for the car kind or grade, resulting in the number of component parts being increased. Further, the degree of freedom of design of the exterior appearance section is restricted by the integral structure of the interior control section and the exterior appearance section.

In recent years, the amount of communication of information in a vehicle has been increasing, so that the number of circuits of connection between the wire harness and the electrical equipment has been increasing. Therefore, connectors connected to the wire harness 61, mounted on the reinforcement 60, have a multi-pole design, and a connecting load, required when connecting the connector, has increased. Therefore, the efficiency of mounting the reinforcement 60 and the dash panel 63 on the vehicle body is lowered.

SUMMARY OF THE INVENTION

It is, therefore, an object of the present invention to provide an instrument panel, including a power/signal transmission system for a vehicle, in which the standardization of the interior control section of each electric equipment (component) can be achieved, the degree of freedom of the design of the exterior appearance section can be improved, and the efficiency of the operation for mounting the instrument panel to the vehicle body can be improved.

In order to achieve the above object, according to the present invention, there is provided an instrument panel module for a vehicle, comprising a dash panel, on which an exterior appearance member of an electrical equipment or component for the vehicle is attached, and a reinforcement integrated with the dash panel, on which an interior control member of the electrical equipment is provided, where the interior control member includes a drive circuit for the electrical equipment (component).

In the instrument panel module, the interior control member of the electrical equipment (component) is separated from the exterior appearance member thereof and integrated with the reinforce as a sub-module.

Thus, the interior control member can be easily standardized, thereby enhancing the general-purpose ability, and besides the degree of freedom of design of the exterior appearance member can be improved.

Preferably, power supply and signal communication between the exterior appearance member and the interior control member are performed in a non-contact connection manner.

In this configuration, the use of connectors for connection purposes is not necessary, and the working efficiency of mounting of the instrument panel module on the vehicle body can be enhanced, and besides a space-saving design can be achieved since the use of connectors is omitted.

Here, it is preferable that the signal communication is performed by at least one of infrared communication and optical communication.

Further, it is preferable that the power supply is performed by power transmission using electromagnetic induction.

In the above configurations, the power/signal transmission can be effected with the simple construction having the relatively-inexpensive component parts.

According to the present invention, there is also provided a method of assembling an instrument panel module for a vehicle, comprising the steps of separating an electrical equipment (component) for the vehicle into an exterior appearance member and an interior control member including a drive circuit for the electrical equipment (component), providing the exterior appearance member on a dash panel, providing the interior control member on a reinforcement, and integrating the dash panel and the reinforcement.

BRIEF DESCRIPTION OF THE DRAWINGS

The above objects and advantages of the present invention will become more apparent by describing in detail preferred exemplary embodiments thereof with reference to the accompanying drawings, wherein:

FIG. 5 is a cross-sectional view explanatory of the manner of mounting the reinforcement on a vehicle body; and FIG. 6 is a perspective view showing the construction of a related-art instrument panel module.

DETAILED DESCRIPTION OF THE PREFERRED EMBODIMENTS

Figure 1:
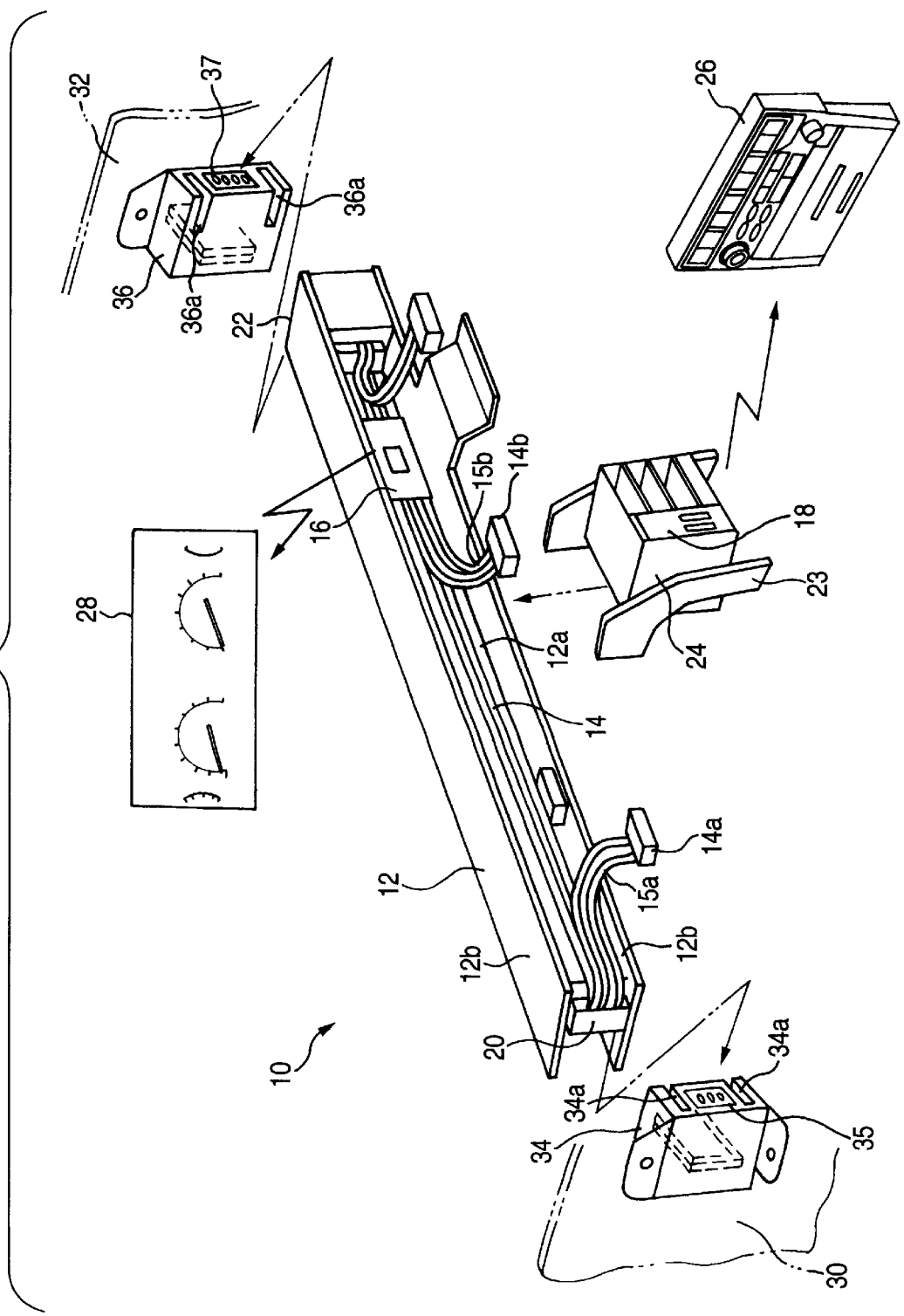
FIG. 1 is an exploded, perspective view of a reinforce used in an instrument panel module according to one embodiment of the invention.

A preferred embodiment of an instrument panel module including a power/signal transmission system of the invention will be described in detail with reference to the accompanying drawings.

An instrument panel module 10 comprises a dash panel 25 (not explicitly shown but similar to the dash panel 63 in FIG. 6) and a reinforcement 12 (shown in FIG. 1) which are united together.

A wire harness 14 is integrally mounted on the reinforcement 12 and extended therealong. A standard ECU (Electric Control Unit) 16, in which a body ECU, meter drive circuits and others are integrated, or a control ECU 18 for various electric equipment, such as an audio system, a clock and an air conditioner, is integrally incorporated in the wire harness 14.

The instrument panel module in this embodiment includes a center console.

A flat cable is used as the wire harness 14, and sub-wire harnesses 15a and 15b (serving as branch wires), provided respectively with connectors 14a and 14b, are connected to the wire harness 14 in a branch-connected manner.

In this embodiment, the reinforcement 12 is a steel member having an H-shaped cross-section, so that the wire harness 14 is installed along a base bottom portion 12a. Connectors 20 and 22 for connecting the wire harness 14 to a vehicle body are connected respectively to both longitudinal ends of the wire harness 14.

A multi-media electrical equipment (component) 24 is mounted on a roughly central portion of the reinforcement 12 via a center brace 23 fixedly mounted on the reinforcement 12. The standard ECU 16 is mounted on the reinforcement 12, and is disposed near to the multi-media electrical equipment (component) 24. The control ECU 18 for effecting the drive control, for example, of the audio system, the clock, the air-conditioner and others, is incorporated in the multi-media electrical equipment (component) 24.

The standard ECU 16 and the control ECU 18 serve as interior control sections including drive control circuits of the electrical equipments (components).

Figure 2:
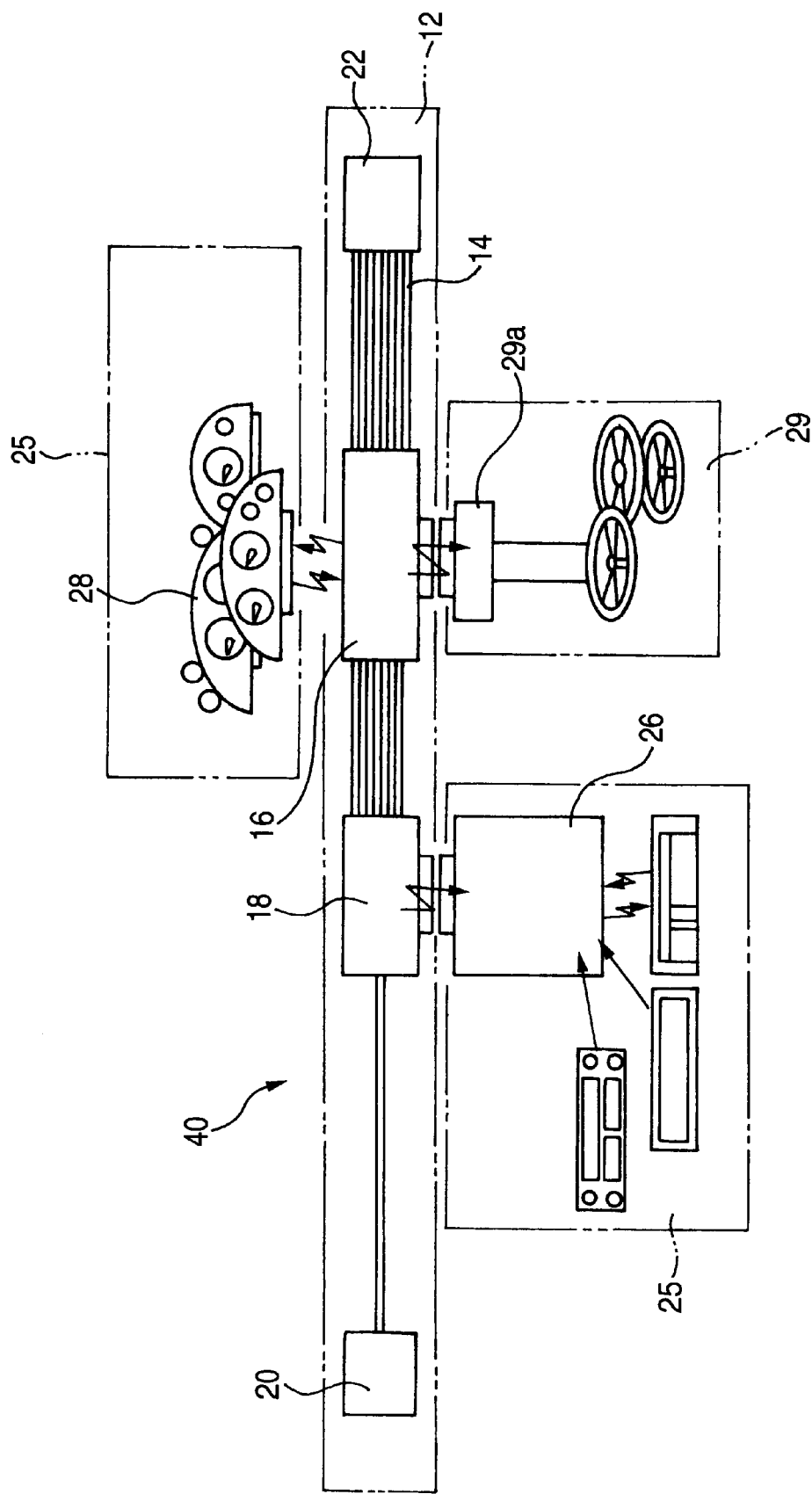
FIG. 2 is a block diagram showing a power/signal transmission system incorporated in the instrument panel module.

As shown in FIG. 2, exterior appearance sections (i.e., a display section or a switch operation section for switches and meters) 26 and 28 of the various types electrical equipments (components) (such for example as the audio system, the clock and the air-conditioner) are incorporated in the dash panel 25 in such a manner that these exterior appearance sections 26 and 28 are separated from the interior control sections (16 and 18) integrated with the reinforcement 12.

The standard ECU 16 is incorporated in the wire harness 14 to obtain operating information of an engine and others, and sends this information to the exterior appearance section 28 of the electrical equipments (components) on the dash panel 25 so that this information is, for example, indicated in the meter.

Figure 3:
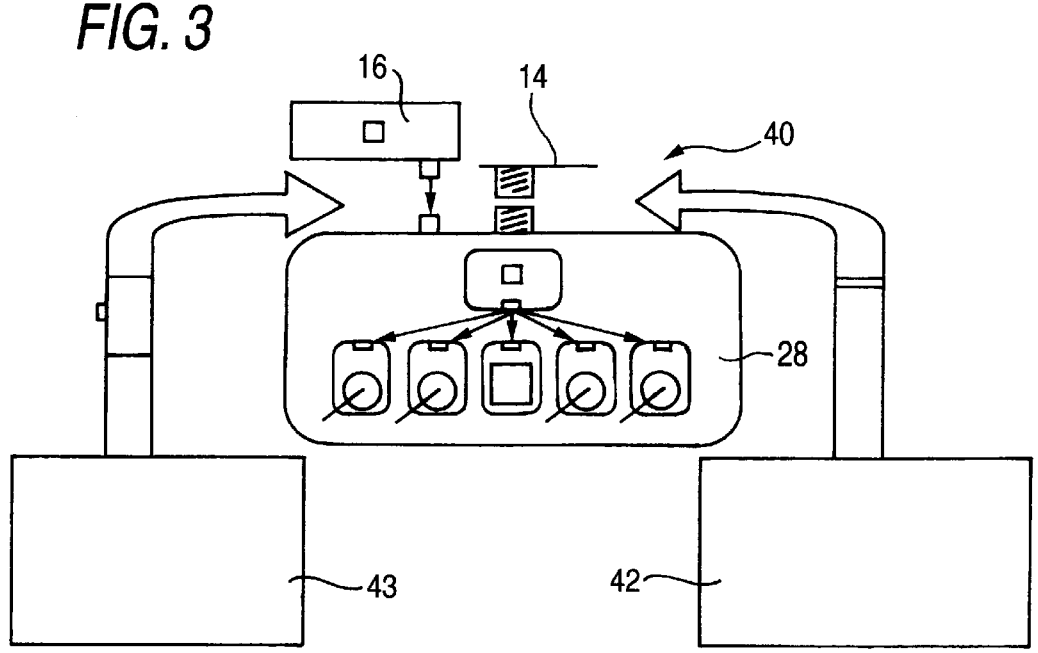
FIG. 3 is a diagram showing an essential portion of the transmission system of FIG. 2.

The power/signal transmission system 40 of this embodiment is provided between the reinforcement 12 and the dash panel 25. More specifically, a power transmission unit 42 and a signal transmission unit 43 are provided between the standard ECU 16 and each exterior appearance section 28, as shown in FIG. 3. The transmission of electric power is performed by an electromagnetic induction system, and the transmission of signals is performed by an information interface, depending on infrared communication or optical communication. Namely, the power/signal transmission is carried out by non-contact connection. By adopting the non-contact connection, the difficulty, encountered in connecting multi-pole connectors, can be eliminated so that the efficiency of the assembling work can be enhanced. Further, since the provision of spaces for connectors is omitted, a space-saving design can be achieved.

As shown in FIG. 2, a steering module 29 is also connected to the standard ECU 16. The above power/signal transmission in a non-contact connection manner is applied also between an exterior appearance section 29a of the steering module 29 and the standard ECU 16.

Further, the above power/signal transmission in a non-contact connection manner is applied also between an exterior appearance section 26 of each multi-media electrical equipment (component) 24 on the dash panel 25 and the control ECU 18.

Although the detail will not be explained here, such a power/signal communication is performed among the audio system, the clock, the air conditioner and others on the dash panel 25, as shown in FIG. 2.

In the instrument panel module 10 of this embodiment, the interior control sections (the standard ECU 16 and the control ECU 18) of the electrical equipments (components) (the audio system, the clock, the air conditioner and others), are separated form the exterior appearance sections (the display section, the switches and others) to be mounted on the dash panel 25 and the center console. The interior control sections are integrated with the wire harness 14 on the reinforcement 12 to form a sub-module.

Thus, the standardization of the interior control sections including the reinforcement 12 can be easily achieved. Further, the degree of freedom of design of the exterior appearance sections including the dash panel 25 can be enhanced. Therefore, a design change according to the car kind can be attained merely by changing the dash panel 25.

Figure 4A:
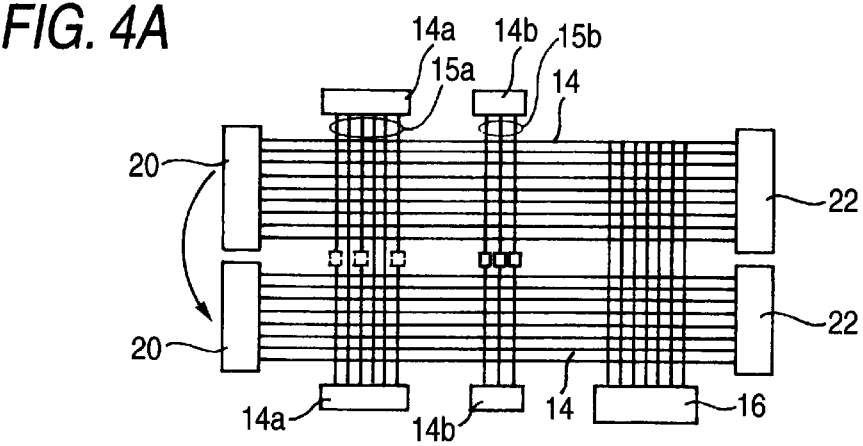
FIG. 4A is a view explanatory of a change of branch connection positions of a wire harness in accordance with the design variations of vehicles.
Figure 4B:
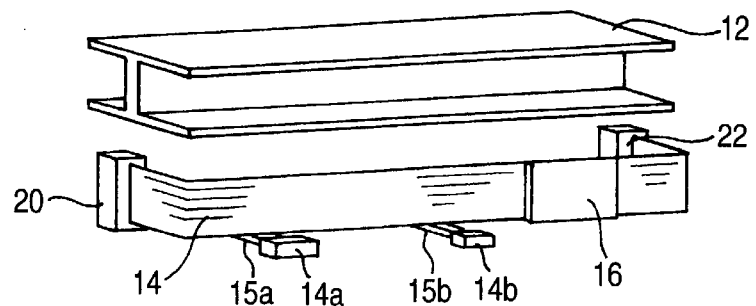
FIG. 4B is a view explanatory of the mounting of the wire harness on a reinforcement.

As shown in FIG. 4A, the interior control section can meet a change of the car kind by changing the branch-connection portions of the sub-wire harnesses 15a and 15b, connected respectively to the connectors 14a and 14b, and a change of the circuit. The wire harness 14, in which the branching positions of the sub-wire harnesses 15a and 15b and the mounting position of the standard ECU 16 are changed in accordance with a change of the car kind, is mounted integrally on the reinforcement 12. However, the physical construction of the interior control section is not essentially changed, and therefore the interior control section can meet different kinds of cars.

Next, the procedure of mounting the sub-modularized reinforcement 12 on the vehicle body 30, 32 will be described with reference to FIGS. 1 and 5.

First, the center brace 23 and the multi-media electrical equipment (component) 24 are mounted on the reinforcement 12. In this condition, the dash panel 25 having the meter display section and the switches mounted thereon, is integrally mounted on the reinforcement 12 to form the instrument panel module. Then, the reinforcement 12 is attached to brackets 34 and 36 which are fixedly secured respectively to right and left mounting portions of the vehicle body 30, 32 by welding or screw-fastening, thus mounting the instrument panel module.

More specifically, as shown in FIG. 5, left ends of horizontal walls 12b and 12b of the reinforce 12 are fitted respectively into fitting grooves 34a formed in the bracket 34, while right ends of the horizontal walls 12b are fitted respectively into fitting grooves 36a formed in the bracket 36, as indicated by arrows.

When the horizontal walls 12b of the reinforcement 12 are fitted into the fitting grooves 34a and 36a, panel-side connectors 20 and 22 mounted on the reinforcement 12 are automatically connected respectively to body-side connectors 35 and 37 fixedly mounted respectively on the brackets 34 and 36.

More specifically, each of the body-side connectors 35 and 37 comprises a self-aligning connector so that when it is out of alignment with the instrument panel connector 20, 22, it can move to absorb this misalignment. Thus, each body connector 35, 37 is brought into alignment with the instrument panel connector 20, 22 during the mounting of the reinforcement 12.

A small-size junction box (not shown) is formed integrally with each of the brackets 34 and 36 so that the connection to the wire harness 14, mounted integrally on the reinforce 12, can be effected collectively. A small-size power module (not shown) can be inserted into the junction box, to supply a predetermined power depending on the specification of a vehicle.

Thus, merely by mounting the reinforcement 12 on the brackets 34 and 36 on the vehicle body 30, 32, the installation of the instrument panel module 10 can be completed, with the panel-side connectors 20 and 22 connected respectively to the body-side connectors 35 and 37.

Therefore, the time and labor, required for connecting the panel-side connectors 20 and 22 respectively to the body-side connectors 35 and 37, are saved, and the instrument panel module-mounting operation can be simplified.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An instrument panel module for a vehicle, comprising:
    at least one electrical component, comprised of an exterior appearance member and an interior control member which are communicatable with each other, the interior control member including a drive circuit for the electrical component;
    a dash panel, having a front side on which the exterior appearance member is attached; and
    a reinforcement, integrated with a rear side of the dash panel and provided with a connector, to which the interior control member of the electrical equipment is connected such that the interior control member is provided on the reinforcement and disposed between the connector and the rear side of the dash panel.

2. The instrument panel module as set forth in claim 1, wherein power supply and signal communication between the exterior appearance member and the interior control member are performed in a non-contact connection manner.

3. The instrument panel module as set forth in claim 2, wherein the signal communication is performed by at least one of infrared communication and optical communication.

4. The instrument panel module as set forth in claim 2, wherein the power supply is performed by power transmission using electromagnetic induction.

5. The instrument panel module as set forth in claim 1, wherein said reinforcement is a steel member having an H-shaped cross-section.

6. A method of assembling an instrument panel module for a vehicle, comprising the steps of:
    separating at least one electrical component for the vehicle into an exterior appearance member and an interior control member including a drive circuit for the electrical component, such that the exterior appearance member and the interior control member and the interior control member are communicatable with each other;
    providing the exterior appearance member on a front side of a dash panel;
    connecting the interior control member to a connector provided on a reinforcement, such that the interior control member is provided on the reinforcement and disposed between the connector and a rear side of the dash panel; and
    integrating the reinforcement with the rear side of the dash panel.

* * * * *